(12) United States Patent
Knoblauch et al.

(10) Patent No.: US 9,033,843 B2
(45) Date of Patent: May 19, 2015

(54) TORQUE TRANSMISSION ARRANGEMENT FOR A MOTOR VEHICLE

(71) Applicant: Dr. Ing. h.c. F. Porsche Aktiengesellschaft, Stuttgart (DE)

(72) Inventors: Daniel Knoblauch, Obergruppenbach (DE); Simon Singer, Utzmemmingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/099,046

(22) Filed: Dec. 6, 2013

(65) Prior Publication Data
US 2014/0158493 A1    Jun. 12, 2014

(30) Foreign Application Priority Data

Dec. 7, 2012  (DE) .......................... 10 2012 111 971

(51) Int. Cl.
| | | |
|---|---|---|
| *F16H 48/06* | (2006.01) | |
| *F16D 11/14* | (2006.01) | |
| *F16D 27/118* | (2006.01) | |
| *F16H 48/24* | (2006.01) | |
| *F16D 11/10* | (2006.01) | |
| *F16H 48/08* | (2006.01) | |
| *F16H 48/34* | (2012.01) | |

(52) U.S. Cl.
CPC .............. *F16D 11/14* (2013.01); *F16D 27/118* (2013.01); *F16H 48/24* (2013.01); *F16D 11/10* (2013.01); *F16D 2300/14* (2013.01); *F16D 2300/18* (2013.01); *F16H 48/08* (2013.01); *F16H 2048/346* (2013.01)

(58) Field of Classification Search
USPC ............ 192/69.8, 110 B, 69.81, 84.92, 30 W; 475/231
See application file for complete search history.

(56) References Cited

U.S. PATENT DOCUMENTS 3,931,872 A * 1/1976 Dissett ............................ 192/43
3,960,253 A * 6/1976 Sigg .............................. 192/69.9
(Continued)

FOREIGN PATENT DOCUMENTS

| DE | 4021653 A1 | 7/1989 |
|---|---|---|
| DE | 102008037885 A1 | 8/2008 |
| DE | 102010039444 A1 | 8/2010 |

(Continued)

OTHER PUBLICATIONS

German Search Report—Mar. 23, 2015.

*Primary Examiner* — Dirk Wright
(74) *Attorney, Agent, or Firm* — Gerald E. Hespos; Michael J. Porco; Matthew T. Hespos

(57) ABSTRACT

A torque transmission arrangement for a motor vehicle has a drive element (4) and at least one output element connected to one another via a transmission (6) and a shift clutch arrangement (8). The shift clutch arrangement (8) has an actuator (40) that moves a first clutch element (32) axially in the direction of a second clutch element (34) via a displacement element (42, 44) in such a way that a positive connection can be produced between the drive element (4) and the output element. The first clutch element (32) bears via an axial bearing arrangement (50) against the displacement element (42, 44) as seen in the axial direction. The axial bearing arrangement (50) has a rolling bearing (58) and a bearing disk element (62) directed toward the first clutch element (32).

19 Claims, 2 Drawing Sheets

(56) References Cited

U.S. PATENT DOCUMENTS

| | | | | |
|---|---|---|---|---|
| 4,558,770 | A * | 12/1985 | Woodruff | 192/48.6 |
| 5,273,499 | A * | 12/1993 | Friedl et al. | 475/241 |
| 7,074,150 | B2 * | 7/2006 | Fusegi et al. | 475/150 |
| 7,152,720 | B2 * | 12/2006 | Claussen et al. | 192/30 W |
| 7,264,568 | B2 * | 9/2007 | Ludwig et al. | 475/233 |
| 8,287,417 | B2 * | 10/2012 | Sudou et al. | 475/231 |
| 8,454,471 | B2 * | 6/2013 | Isken et al. | 475/231 |
| 8,591,375 | B2 * | 11/2013 | Maruyama et al. | 475/231 |

FOREIGN PATENT DOCUMENTS

| | | |
|---|---|---|
| DE | 102009023906 A1 | 12/2010 |
| DE | 102011079084 A1 | 5/2012 |
| JP | S63235748 | 9/1988 |
| JP | 2008286408 | 11/2008 |
| JP | 2009014134 | 1/2009 |

* cited by examiner ered via the longitudinal toothings 30, 32 to the axle side shafts, which are not illustrated further.

TORQUE TRANSMISSION ARRANGEMENT FOR A MOTOR VEHICLE

CROSS REFERENCE TO RELATED APPLICATION

This application claims priority under 35 USC 119 to German Patent Appl. No. 10 2012 111 971.6 filed on Dec. 7, 2012, the entire disclosure of which is incorporated herein by reference.

BACKGROUND

1. Field of the Invention

The invention relates to a torque transmission arrangement for a motor vehicle having a drive element and at least one output element that are connected to one another via a transmission and a shift clutch arrangement. The shift clutch arrangement has an actuator that moves a first clutch element axially in the direction of a second clutch element via a displacement element in such a way that a positive connection can be produced between the drive element and the output element. The first clutch element bears via an axial bearing arrangement against the displacement element as seen in the axial direction.

2. Description of the Related Art

Torque transmission arrangements are well known from the prior art and are used in motor vehicles to transmit torques produced by a drive device, such as an internal combustion engine or an electric motor, to an output device, such as the wheels of a motor vehicle. In various applications there is the requirement to interrupt or switch on the power flow. For example, some drive trains have an engine and an activatable electric drive that drives a drive axle as required. Here, the clutch is actuated by an actuator that is arranged on a fixed housing part and is operatively connected to a first clutch element of the shift clutch via a displacement element and an axial bearing. Installation is difficult due to the small installation space and the demands for a low weight. Thus, the known axial bearings for the torque transmission arrangement of the generic type have sliding bearings. However, these axial bearings have the disadvantage that they have a certain air gap in the non-actuated or non-engaged state, with the result that the actuation of the shift clutch is prone to errors. Furthermore, the sliding bearing increases an input of heat into the entire system exists.

The object of the invention is to avoid the aforementioned disadvantages.

SUMMARY OF THE INVENTION

This object is achieved according to the invention in that the axial bearing arrangement has a rolling bearing and a bearing disk element directed toward the first clutch element. The rolling bearing with a corresponding bearing disk element surprisingly provides a substantially improvement in the shift force transmission. The shift actuation now proceeds in a completely play-free manner, and the introduction of heat is minimized. Furthermore, there result further advantages in terms of a lower wear and an improved drag torque. The rolling bearing preferably has a stop disk on the side opposite the bearing disk element. The first clutch element preferably is under prestress via a spring to ensure a reliable disengagement of the first clutch in the non-actuated state. A sensor with a transducer element preferably is provided for reliably monitoring the engaging and disengaging operation. The transducer element preferably is arranged between the axial bearing arrangement and the first clutch for reliably monitoring the engaging and disengaging operation. The transducer element preferably is a sensor disk that centers the bearing disk element via a centering surface. Alternatively, the sensor disk and the bearing disk element may be designed in one piece.

The bearing disk element can have a shoulder for centering the rolling bearing. The rolling bearing preferably is a needle bearing due to the small overall space.

The torque transmission arrangement preferably is part of a drive train in which the drive element is designed as a drive gear and two axle side shafts are provided as output elements. The transmission preferably is a differential transmission and the shift clutch arrangement preferably is a shift claw clutch. In a further advantageous embodiment, provision is made for the first clutch element to be a shift sleeve and the second clutch element to be a shift toothing element.

The actuator preferably is an electromagnetic actuator that acts on the displacement element and has an armature element, designed as an annular piston, and a sleeve. The annular piston can be produced from a ferromagnetic material and the sleeve can be produced from a paramagnetic or nonmagnetic material. The bearing disk element preferably is produced from a paramagnetic or nonmagnetic material. The use of a paramagnetic or nonmagnetic material ensures that there is no undesired magnetic flux or short-circuit in the region of the electromagnetic actuator.

The invention will be explained in detail below with reference to the drawing.

DETAILED DESCRIPTION OF THE PREFERRED EMBODIMENTS

Figure 1:
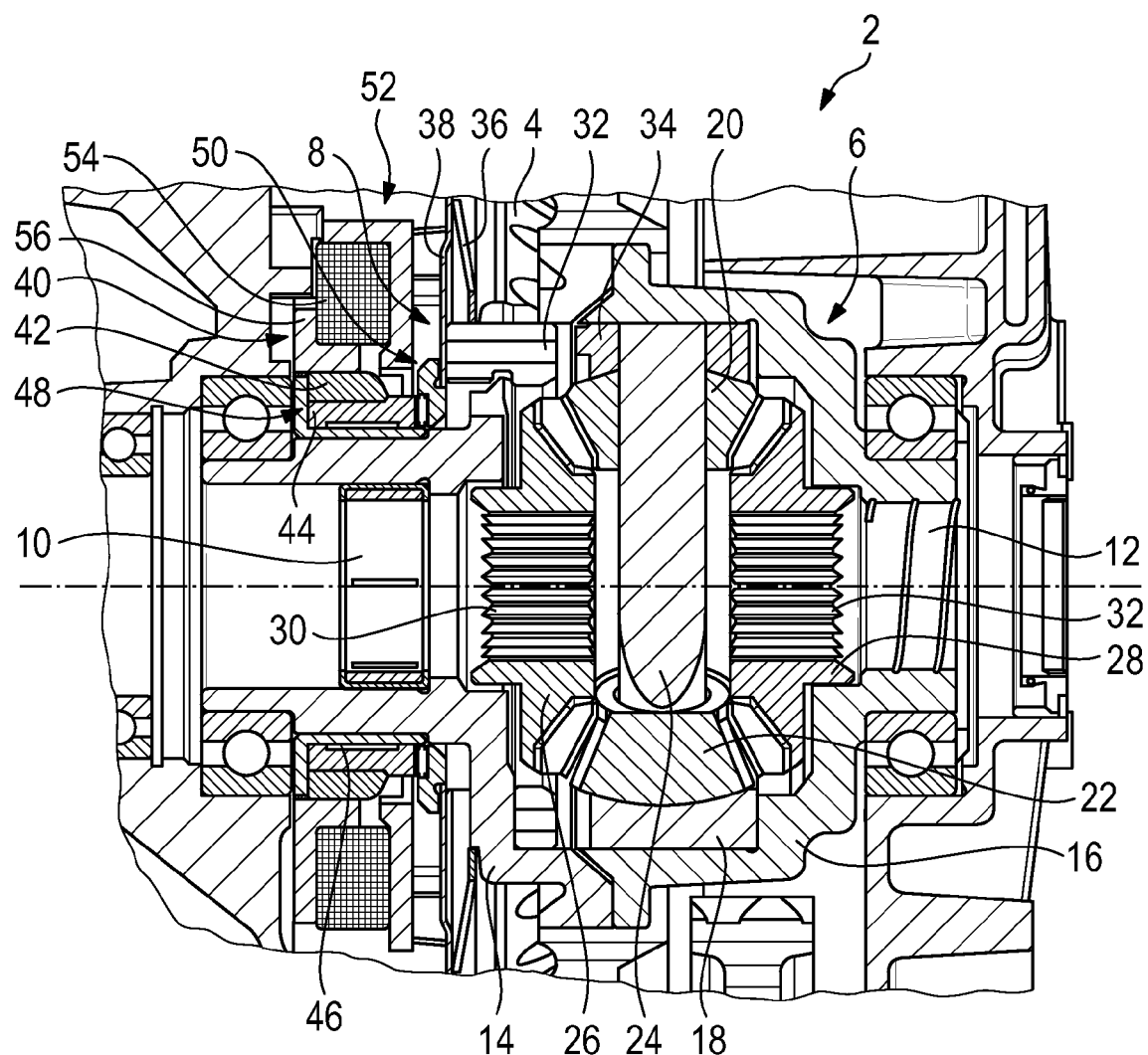
FIG. 1 is a sectional view of a torque transmission arrangement of the invention.

FIG. 1 shows a torque transmission arrangement 2 according to the invention for a motor vehicle. The torque transmission arrangement 2 has a drive element 4 in the form of a drive gear from which a torque is transmitted via a transmission 6 and via a shift clutch arrangement 8 to output elements. The output elements may be axle side shafts that are connected in a known manner to drive wheels and that are mounted via constant-velocity joints 10, 12 in the torque transmission arrangement 2.

The transmission 6 is a differential transmission known per se and is therefore described only by way of example. The differential transmission 6 has a two-part differential cage 14, 16 that is connected in a rotationally fixed manner to the drive gear 4. Furthermore, a differential carrier 18 is mounted slidably in the differential cage part 16. Two compensating gears 20, 22 are mounted rotatably on a journal 24 that is connected in a rotationally fixed manner to the differential carrier 18. The two compensating gears 20, 22 are in engagement in a known manner with side shaft gears 26, 28 that are in engagement via a respective longitudinal toothing 30, 32 with a corresponding toothing of the axle side shafts, which are not illustrated further.

Figure 2:
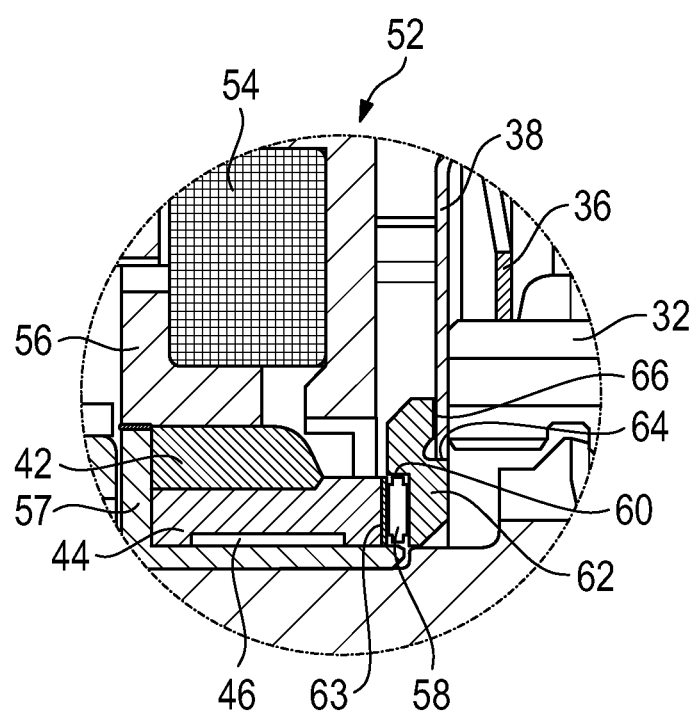
FIG. 2 shows a detail view of an axial bearing arrangement from FIG. 1.

The shift clutch arrangement 8, shown also in FIG. 2, is designed as a shift claw clutch and has a first clutch element 32 designed as a shift sleeve. The first clutch element 32 is movable axially in the direction of a second clutch element 34 that is designed in one piece or multiple pieces as a shift toothing element. The second clutch element 34 is connected fixedly to the differential carrier 18. In the disengaged position, the first clutch element 32 is under the prestress of a spring element 36 which, in the illustrated embodiment, bears in turn against a transducer element 38, which is designed as a sensor disk. The transducer element 38 is connected operatively in a known manner to a Hall sensor, which is not illustrated further. The shift clutch arrangement 8 comprises an electromagnetic actuator 40 that acts in a known manner on an armature element 42 designed as an annular piston. The armature element 42 is produced from a ferromagnetic material. The armature element 42 in turn is pressed on a sleeve 44 that is arranged via a sliding bearing 46 on a part 57 made of nonmagnetic material. The sleeve 46 is produced from nonmagnetic material to prevent a magnetic flux leakage.

An annular piston 44 and sleeve 46 form a displacement element 48 that acts via an axial rolling bearing arrangement 50 on the transducer element 38 and thus on the first clutch element 32 in such a way that, during energization, the clutch element 32 is displaced axially in the direction of the second clutch element 34 and hence the transmission of torque is ensured.

FIG. 2 shows the shift clutch arrangement 8 from FIG. 1 in a detail. There can clearly be seen here the electromagnetic actuator 40 has a housing 52 with a coil 54 arranged therein and with an electromagnetic circuit that has a return device 56, for example made of a soft magnetic material, the part 57 welded thereto and made of nonmagnetic material, such as stainless steel, and the armature element 42. The sleeve 44 is in direct contact with an axial needle bearing 58 of the axial rolling bearing arrangement 50. This axial needle bearing 58, in turn, is centered via a shoulder 60 of a bearing disk element 62 and has a stop disk 63 on the side opposite the bearing disk element 62. The embodiment illustrated here represents only one possible variant. The arrangement of bearing disk element 62 and stop disk 63 may be interchanged for example with respect to the axial needle bearing 58.

The bearing disk element 62 is centered via a centering surface 64 of the transducer element 38 and can act via a surface 66 on the transducer element 38 in such a way that the axial movement of the sleeve 46 can be transmitted to the first clutch element 32 designed as a shift sleeve. There can also clearly be seen here the spring element 36, which is under prestress in such a way that the first clutch element 32 is transferred automatically into the disengagement position during deactivation of the actuator 40.

What is claimed is:

1. A torque transmission arrangement for a motor vehicle having a drive element and at least one output element connected to one another via a transmission and a shift clutch arrangement, the shift clutch arrangement having an actuator that moves a first clutch element axially in the direction of a second clutch element via a displacement element so that a positive connection is produced between the drive element and the output element, the first clutch element bearing via an axial bearing arrangement against the displacement element as seen in the axial direction, the axial bearing arrangement having a rolling bearing and a bearing disk element directed toward the first clutch element, and a sensor with a transducer element, the transducer element being arranged between the axial bearing arrangement and the first clutch element, the transducer element being a sensor disk that centers the bearing disk element via a centering surface.

2. The torque transmission arrangement of claim 1, wherein the rolling bearing has a stop disk on a side opposite to the bearing disk element.

3. The torque transmission arrangement of claim 2, wherein the first clutch element is under prestress via a spring element.

4. The torque transmission arrangement of claim 1, wherein the sensor disk and the bearing disk element are integral.

5. The torque transmission arrangement of claim 1, wherein the rolling bearing is a needle bearing.

6. The torque transmission arrangement of claim 1, further comprising a drive provided as the drive element and two axle side shafts defining output elements, wherein the transmission is a differential transmission and the shift clutch arrangement is a shift claw clutch.

7. The torque transmission of claim 6, wherein the first clutch element is a shift sleeve and the second clutch element is a shift toothing element.

8. The torque transmission arrangement of claim 7, wherein the annular piston is produced from a ferromagnetic material and the sleeve is produced from a paramagnetic or nonmagnetic material.

9. The torque transmission arrangement of claim 1, wherein the actuator is an electromagnetic actuator that acts on the displacement element, which has an armature element, designed as an annular piston, and a sleeve.

10. The torque transmission arrangement of claim 1, wherein the bearing disk element is produced from a paramagnetic or nonmagnetic material.

11. A torque transmission arrangement for a motor vehicle having a drive element and at least one output element connected to one another via a transmission and a shift clutch arrangement, the shift clutch arrangement having an actuator that moves a first clutch element axially in the direction of a second clutch element via a displacement element so that a positive connection is produced between the drive element and the output element, the first clutch element bearing via an axial bearing arrangement against the displacement element as seen in the axial direction, the axial bearing arrangement having a rolling bearing and a bearing disk element directed toward the first clutch element, wherein the bearing disk element has a shoulder for centering the rolling bearing.

12. The torque transmission arrangement of claim 11, wherein the rolling bearing has a stop disk on a side opposite to the bearing disk element.

13. The torque transmission arrangement of claim 12, wherein the first clutch element is under prestress via a spring element.

14. The torque transmission arrangement of claim 11, wherein the rolling bearing is a needle bearing.

15. The torque transmission arrangement of claim 11, further comprising a drive provided as the drive element and two axle side shafts defining output elements, wherein the transmission is a differential transmission and the shift clutch arrangement is a shift claw clutch.

16. The torque transmission of claim 15, wherein the first clutch element is a shift sleeve and the second clutch element is a shift toothing element.

17. The torque transmission arrangement of claim 11, wherein the actuator is an electromagnetic actuator that acts on the displacement element, which has an armature element, designed as an annular piston, and a sleeve.

18. The torque transmission arrangement of claim 17, wherein the annular piston is produced from a ferromagnetic material and the sleeve is produced from a paramagnetic or nonmagnetic material.

19. The torque transmission arrangement of claim 11, wherein the bearing disk element is produced from a paramagnetic or nonmagnetic material.

\* \* \* \* \*